United States Patent
Caspers et al.

(10) Patent No.: US 10,218,699 B2
(45) Date of Patent: Feb. 26, 2019

(54) SYSTEMS AND METHODS FOR ADDING A NON-INHERENT COMPONENT TO A DEVICE KEY OF A NETWORKED DEVICE

(71) Applicant: ROCKWELL AUTOMATION TECHNOLOGIES, INC., Mayfield Heights, OH (US)

(72) Inventors: John P Caspers, Racine, WI (US); Patrick D Telljohann, Solon, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 219 days.

(21) Appl. No.: 15/217,365

(22) Filed: Jul. 22, 2016

(65) Prior Publication Data

US 2018/0026978 A1   Jan. 25, 2018

(51) Int. Cl.
*H04L 29/06* (2006.01)
*G06F 17/30* (2006.01)
(Continued)

(52) U.S. Cl.
CPC .... *H04L 63/0876* (2013.01); *G06F 17/30241* (2013.01); *H04L 41/085* (2013.01);
(Continued)

(58) Field of Classification Search
CPC .. H04L 63/062; H04L 63/107; H04L 63/0876
See application file for complete search history.

(56) References Cited

U.S. PATENT DOCUMENTS

| 4,095,862 A | 6/1978 | Hatch |
| 4,252,396 A | 2/1981 | Wilson |

(Continued)

FOREIGN PATENT DOCUMENTS

| CN | 2648674 Y | 10/2004 |
| EP | 1967929 A2 | 9/2008 |

(Continued)

OTHER PUBLICATIONS

Anderson, et al., Automated Power Distribution System Hardware, In Energy Conversion Engineering Conference, 1989, IECEC—89, Proceedings of the 24th Intersociety, pp. 579-584, IEEE, 1989.

(Continued)

*Primary Examiner* — Ali Shayanfar
(74) *Attorney, Agent, or Firm* — Quarles & Brady LLP

(57) ABSTRACT

Systems, methods and apparatus for adding a non-inherent component to a device key of a networked device are disclosed. The methods include receiving a device key of the networked device, where the device key comprises one or more device identifying attributes of the networked device in the nodal geographic network, identifying location information of the networked device in the nodal geographic network, and where the location information represents a geographic relationship between the networked device and other network nodes of the nodal geographic network, assigning a position attribute to the networked device according to the identified location information of the networked device in the nodal geographic network, and adding the position attribute to the device key as the non-inherent component for the networked device, and storing the device key independently from the networked device or in the networked device, or both.

20 Claims, 5 Drawing Sheets

(51) Int. Cl.
*H04L 12/24* (2006.01)
*H04L 29/08* (2006.01)

(52) U.S. Cl.
CPC ............ *H04L 41/12* (2013.01); *H04L 63/062* (2013.01); *H04L 63/107* (2013.01); *H04L 67/10* (2013.01); *H04L 67/18* (2013.01)

(56) References Cited

U.S. PATENT DOCUMENTS

| | | |
|---|---|---|
| 4,359,257 A | 11/1982 | Lopinski et al. |
| 4,641,904 A | 2/1987 | Kosugi et al. |
| 4,773,876 A | 9/1988 | Nakamura et al. |
| 5,059,137 A | 10/1991 | Dale et al. |
| 5,242,313 A | 9/1993 | Logerot et al. |
| 5,242,314 A | 9/1993 | Di Giulio et al. |
| 6,074,238 A | 6/2000 | DeRoss et al. |
| 6,232,557 B1 | 5/2001 | Lounsbury et al. |
| 6,394,833 B1 | 5/2002 | Bulmer et al. |
| 6,400,103 B1 | 6/2002 | Adamson |
| 6,425,770 B1 | 7/2002 | Lostoski et al. |
| 6,442,144 B1 | 8/2002 | Hansen et al. |
| 6,732,202 B1 | 5/2004 | Ying |
| 6,935,885 B2 | 8/2005 | Scherer et al. |
| 7,080,150 B1 | 7/2006 | Wehrle et al. |
| 7,112,073 B2 | 9/2006 | Morlok |
| 7,228,363 B1 | 6/2007 | Wehrle et al. |
| 7,313,607 B1 | 12/2007 | Rosenberg |
| 7,412,530 B1 | 8/2008 | Wehrle et al. |
| 7,483,396 B2 | 1/2009 | Steindl |
| 7,721,079 B2 | 5/2010 | Wehrle et al. |
| 8,433,827 B2 | 4/2013 | Biehler |
| 9,660,861 B2* | 5/2017 | Saltsidis ............... H04L 41/082 |
| 9,813,290 B2* | 11/2017 | Saltsidis ............ H04L 41/0806 |
| 9,876,674 B1* | 1/2018 | Murray ............... H04L 41/0677 |
| 9,967,244 B2* | 5/2018 | Saboori .................. H04L 63/06 |
| 2002/0184573 A1 | 12/2002 | Rousseau et al. |
| 2004/0158713 A1 | 8/2004 | Aneweer et al. |
| 2005/0021738 A1 | 1/2005 | Goeller et al. |
| 2005/0024026 A1 | 2/2005 | Hung et al. |
| 2005/0243739 A1 | 11/2005 | Anderson et al. |
| 2005/0262218 A1 | 11/2005 | Cox et al. |
| 2008/0016515 A1* | 1/2008 | Naim .................. H04L 63/0227 719/313 |
| 2008/0192650 A1 | 8/2008 | Kolhi |
| 2008/0281947 A1 | 11/2008 | Kumar |
| 2009/0198385 A1 | 8/2009 | Oe et al. |
| 2009/0205022 A1* | 8/2009 | Sanchez ................ H04L 63/064 726/4 |
| 2010/0030345 A1 | 2/2010 | Cole et al. |
| 2010/0094482 A1* | 4/2010 | Schofield ............... G08G 1/205 701/2 |
| 2010/0174909 A1* | 7/2010 | Ashdown ............. H04L 9/0891 713/171 |
| 2010/0186229 A1 | 7/2010 | Enomoto et al. |
| 2010/0205281 A1* | 8/2010 | Porter ..................... H04L 41/12 709/220 |
| 2011/0202843 A1* | 8/2011 | Morris .................... G06F 3/013 715/716 |
| 2011/0222200 A1 | 9/2011 | Fuller et al. |
| 2012/0066356 A1 | 3/2012 | Nguyen et al. |
| 2012/0253540 A1 | 10/2012 | Coyne et al. |
| 2012/0258726 A1* | 10/2012 | Bansal .............. H04M 1/72563 455/456.1 |
| 2013/0073760 A1 | 3/2013 | Wiesgickl |
| 2013/0275566 A1* | 10/2013 | Huth ....................... H04L 41/12 709/220 |
| 2013/0288640 A1 | 10/2013 | Bonner |
| 2014/0258455 A1 | 9/2014 | Julicher |
| 2014/0280881 A1 | 9/2014 | Szamonek et al. |
| 2015/0117244 A1* | 4/2015 | Williamson .......... H04L 43/045 370/252 |
| 2015/0201101 A1 | 7/2015 | Kaminushi |
| 2015/0256389 A1 | 9/2015 | Ruess et al. |
| 2015/0264408 A1* | 9/2015 | Hao .................. H04N 21/25841 725/23 |
| 2015/0350229 A1 | 12/2015 | Mitchel |
| 2015/0365238 A1* | 12/2015 | Hui ....................... H04L 9/3247 713/178 |
| 2016/0006628 A1 | 1/2016 | Herring et al. |
| 2016/0013948 A1* | 1/2016 | Moses ..................... H04L 41/28 713/156 |
| 2016/0070282 A1 | 3/2016 | Chapel et al. |
| 2016/0139999 A1 | 5/2016 | Gabler et al. |
| 2016/0269373 A1* | 9/2016 | White ..................... H04L 63/10 |
| 2017/0025892 A1 | 1/2017 | Van Ostrand et al. |
| 2017/0026441 A1* | 1/2017 | Moudy ................. G06F 9/5027 |
| 2017/0134477 A1 | 5/2017 | Ben Dayan et al. |
| 2017/0237556 A9* | 8/2017 | Denning ............... H04L 9/0822 713/168 |
| 2017/0272452 A1 | 9/2017 | Kraemer et al. |
| 2017/0303079 A1* | 10/2017 | Ikemoto ................. H04W 4/06 |

FOREIGN PATENT DOCUMENTS

| | | |
|---|---|---|
| EP | 1983616 A2 | 10/2008 |
| GB | 2442304 B | 10/2008 |
| KR | 1020110017576 A | 2/2011 |
| WO | 03023634 A1 | 3/2003 |
| WO | 2006089718 A2 | 8/2006 |
| WO | 2009150527 A1 | 12/2009 |

OTHER PUBLICATIONS

Burgess, How to Assign a Static IP Address in Windows 7, 8, 10, XP, or Vista, Nov. 10, 2013, https://www.howtogeek.com/howto/19249/how-to-assign-a-static-ip-address-in-xp-vista-or-windows-7/, 17 pages.

Matray, et al., On the Network Geography of the Internet, In INFOCOM, 2011 Proceedings IEEE, pp. 126-130, IEEE, 2011.

Moyne, et al., The Emergence of Industrial Control Networks for Manufacturing Control, Diagnostics, and Safety Data, Proceedings of the IEEE, 2007, 95(1):29-47.

Satchell, How Can I Configure a DHCP Server to Assign Addresses Based on the OS that is Running, https://lists.isc.org/pipermail/dhcp-users/2010-May/011783.html, May 2010, 9 pages.

European Patent Office, Extended European Search Report, EP 17177835.0, dated Jan. 2, 2018, 10 pages.

European Patent Office, Extended European Search Report, EP 17178251.9, dated Sep. 27, 2017; 8 pages.

European Patent Office, Partial European Search Report, EP 17178252.7, dated Jan. 3, 2018, 15 pages.

European Patent Office, Extended European Search Report, EP 17178252.7, dated Mar. 27, 2018; 18 pages.

European Patent Office, Extended European Search Report, EP 17178256.8, dated Nov. 30, 2017, 7 pages.

European Patent Office, Extended European Search Report; EP 17178258.4, dated Dec. 20, 2017, 9 pages.

Extended European Search Report; Appln. No. 171782543-1862; dated Oct. 5, 2017; 8 pages.

Siemens, Simatic Net, AS-Interface—Introduction and Basics Manual, Release Apr. 2006, 62 pages.

* cited by examiner

SYSTEMS AND METHODS FOR ADDING A NON-INHERENT COMPONENT TO A DEVICE KEY OF A NETWORKED DEVICE

BACKGROUND

The subject matter disclosed within relates generally to a communication network, and particularly relates to systems and methods for adding a non-inherent component to a device key of a networked device.

A network system may be used for interconnecting devices for communication. A range of devices may be included in the network system. Device keys are used as a means of device identification in network systems. In existing network systems, they are comprised of device identifying attributes that are inherent to the device, such as the device vendor, the device type, the device product code, the device hardware revision, the device software revision, the device serial number, etc. Network systems compare expected device keys to actual device keys for network devices to verify device compatibility within a system. 11

When wiring a range of network devices in a control panel, the relative position of each device is chosen so that wiring can be accomplished efficiently and accurately. When replacing a network device in a control panel, it is important to ensure that the new network device has a compatible set of inherent device key identifying attributes with the old device, and to ensure that the new network device is wired into the panel at the same location as the old network device. Adding a non-inherent component to the device key attributes would facilitate this.

BRIEF SUMMARY OF THE INVENTION

The present invention provides methods, a network apparatus and systems for adding a non-inherent component to a device key of a networked device.

In one aspect, the present invention provides a method of adding a non-inherent component to a device key of a networked device. The method may include receiving a device key of the networked device, where the networked device may be a network node in a nodal geographic network having multiple network nodes and where the multiple network nodes may be connected with each other, and the device key may include one or more device identifying attributes of the networked device in the nodal geographic network.

The method may also include identifying location information of the networked device in the nodal geographic network, where the location information may represent the geographic relationship between the networked device and other network nodes of the nodal geographic network, assigning a position attribute to the networked device according to the identified location information of the networked device in the nodal geographic network, and adding the position attribute to the device key as the non-inherent component for the networked device, and storing the device key independently from the networked device.

In another aspect, the present invention provides a network apparatus that may include a processor and non-transitory computer readable medium storing processing instructions for adding a non-inherent component to a device key of a networked device, where the processing instructions, when executed by the processor, may cause the processor to: receive a device key of the networked device, where the networked device may be a network node in a nodal geographic network having multiple network nodes and where the multiple network nodes may be connected with each other, and the device key comprises one or more device identifying attributes of the networked device in the nodal geographic network.

The processing instructions, when executed by the processor, may further cause the processor to: identify location information of the networked device in the nodal geographic network, where the location information may represent a geographic relationship between the networked device and other network nodes of the nodal geographic network, assign a position attribute to the networked device according to the identified location information of the networked device in the nodal geographic network, and add the position attribute to the device key as a non-inherent component for the networked device, and store the device key independently from the networked device.

In yet another aspect, the present invention provides a system that may include a nodal geographic network having multiple network nodes, a networked device of the nodal geographic network, and a network apparatus having a processor and non-transitory computer readable medium storing processing instructions for adding a non-inherent component to a device key of the networked device, where the processing instructions may include a device key receiver to receive a device key of the networked device, where the networked device may be a network node in the nodal geographic network having the multiple network nodes and where the multiple network nodes may be connected with each other, and the device key may include one or more device identifying attributes of the networked device in the nodal geographic network.

The processing instructions may further include a location information identifier to identify location information of the networked device in the nodal geographic network, where the location information may represent a geographic relationship between the networked device and other network nodes of the nodal geographic network, a position attribute assigner to assign a position attribute to the networked device according to the identified location information of the networked device in the nodal geographic network, and the position attribute adder to add the position attribute to the device key as the non-inherent component for the networked device, and store the device key independently from the networked device.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1:
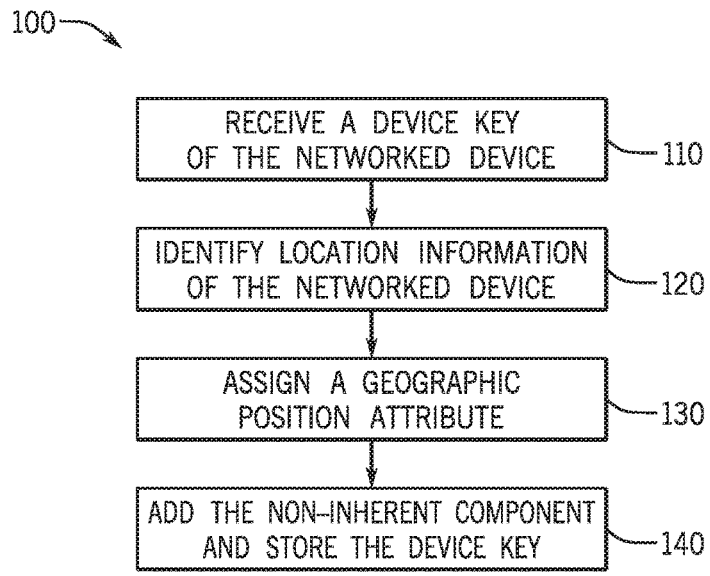
FIG. 1 is a flowchart that illustrates a method of adding a non-inherent component to a device key of a networked device.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 shows a flowchart that illustrates a method 100 of adding a non-inherent component to a device key of a networked device. As shown in FIG. 1, the method 100 includes receiving a device key of the networked device 110, identifying location information of the networked device 120, assigning a non-inherent component, e.g., a position attribute 130, and adding the non-inherent component to the device key and storing the device key 140.

The networked device may be one of multiple devices in a network. The multiple devices may be connected with each other in the network. The network may have nodal geography that reflects the physical locations of multiple devices in the network. The nodal geographic network may be a network with nodes where the relative locations of devices in the network are depicted. Such relative location reflects how a networked device locates with respect to other devices in the network.

Each networked device in the network may have a device key that may include one or more device identifying attributes associated with the networked device. The one or more attributes may be identifiable and may be associated with a device. The device key that has the one or more identifying attributes may be used to determine device compatibility during a device replacement operation. For example, the device key may include a device vendor, a device type, a device product code, a device series, device serial number, or any combination thereof. The device product code may be a catalog number, and the device series may also be a device revision as non-limiting examples.

To receive a device key (110), network communication among devices on the network may be established, and a network apparatus such as a network gateway or router may be configured to collect device keys from the devices. For example, the network gateway may transmit a message to all network devices to produce messages containing their device key information, and collect the device key attributes from devices. The nodal geographic network may have many topologies. One example may be a linear network topology, where the multiple network devices or multiple network nodes are arranged sequentially in a linear network and are connected by using a ribbon cable. In this example, a network gateway may collect device keys from network devices sequentially starting with the device immediately next to the gateway and continuing one device at a time until all device keys have been collected. This sequencing can be accomplished through the use of a discovery line of a ribbon cable that enables message production from network devices in sequence with their location on the network.

To identify location information of the networked device (120), a geographic location of all devices in the network may be identified. The location information may represent a geographic relationship between the networked device and other devices or nodes in the network. For a linear network, the geographic location may be a sequence position for a device. For example, when a networked device in the middle of the second device and the fourth device in a linear network, the networked device has a third position in the linear network.

Location information may be complicated. For example, in a three-dimensional (3D) network, a three dimensional coordinate of a networked device can be represented by three numbers (x, y, z). As such, a mapping table may be developed to store the three dimensional coordinates of the device and the three dimensional coordinates may be mapped to a unique number for the network and may be saved in the mapping table. In this way, the complicated location information may be simplified. The mapping table may be stored in the network gateway, and any dedicated node on the network.

To assign a position attribute (130), the identified information for the networked device may be used. The position attribute is not associated with a network address. A network address is used in network protocol device addressing. A position attribute is used to identify the position of the device on the network. For example, if the networked device is identified as the third position in the linear network, the position attribute for the networked device may be assigned as number three (3) but the network address may be something other than 3 since it has no relationship to the position attribute. Sometimes, gaps may be left in the network addresses, but in a linear network there may be no gaps in the position attribute. For example, the third position in the linear network may be assigned a network address that is associated with the number six (6).

For assigning the position attribute for a 3D network, the location information may be the three number coordinates or may be the unique number that is mapped to the three number coordinates. The three number coordinates may be first mapped to a unique number in the mapping table and the unique number may be assigned a position attribute in a similar way as the linear network.

To add the non-inherent component and store the device key (140), the assigned position attribute may be added as the non-inherent component to the device key for the network device. After this additional key component is added, the updated device key may be stored in the networked device. Alternatively, the updated device key may be stored independently from the network device. For example, the updated device key may be stored at the network gateway, or a standalone data storage such as a standalone database or a combination. The updated device key may also be stored remotely from the network. The network gateway may or may not be one of the multiple network nodes in the nodal geographic network.

After the updated device key is available, the added non-inherent component, i.e., the position attribute, may be used to ensure that a compatible replacement device is geographically placed in the same relative position when a networked device is replaced. For example, on a linear bus, when a networked device is in the third position, the networked device may have a position attribute of the number three (3) assigned and the number three (3) may be stored as the non-inherent component for the updated device key. The updated device key may be stored in the networked device or may be stored in the network gateway, or may be stored on both places. When the third networked device is detached from the network and is placed in the fifth position on the linear bus, the network key may be checked and an error or an alert may be triggered because the position attribute of networked device three (3) does not match the network position five (5). Thus, because the non-inherent component is added in the device key, an error (or an alert) may be generated when the relative relationship between networked devices are changed and are detected.

In another scenario, when the networked device is replaced by performing a device replacement operation, the network may verify that the networked device can only be replaced with the networked device with the same device key component. Thus, because of the additional position attribute component in the device key, the same relative position of devices on the network can be ensured when a compatible replacement device is geographically placed. Therefore, the device key for a replacement device at a given geographic position on the network may be checked before any device network addressing operations may be performed. For example, in linear network systems that implement something such as a "Device Replacement", the addition of the geographic position as the additional non-inherent component of the device key may ensure that the replacement device may be placed on the bus at the same relative location as the device to be replaced.

In addition, when a new device is placed on the network between two existing nodes, the network may have the ability to discover the resulting network geography by retrieving the device key components of the device keys before assigning new network addresses. The network user may thus have the ability to set the network address of the new node while allowing the network addresses of the original network nodes to remain unchanged. As a result, on the linear bus and when a new node is added, it is not necessary to re-address all nodes to the right (for example) of the added new device, which is required in linear network systems that implement automatic device addressing. Further, because the devices on the linear bus keep the network addresses without re-addressing, when a new node is added, there may be no need to update any node addresses and/or node numbers in the system logic where the node addresses and/or node numbers are referenced.

Once the new node is commissioned, a new reference network geography with all device keys may be established and stored. The updated device keys may be stored in the network gateway. The updated device keys may also be stored in a standalone data storage such as a database, or may be stored remotely from the network.

Figure 2:
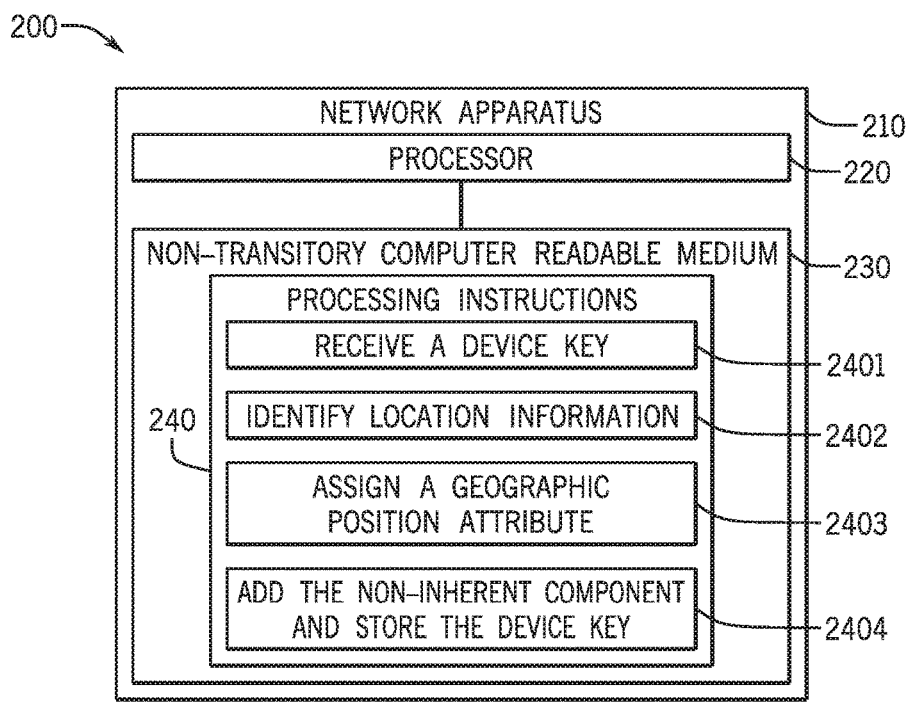
FIG. 2 illustrates a network apparatus for adding a non-inherent component to a device key of a networked device.

FIG. 2 illustrates a network apparatus 210 for adding a non-inherent component to a device key of a networked device. As shown in FIG. 2, the network apparatus 210 may include a processor 220 and non-transitory computer readable medium 230 storing processing instructions 240 for adding a non-inherent component to a device key of a networked device. The network apparatus 210 may or may not be one of the multiple network nodes in the nodal geographic network.

The processing instructions 240, when executed by the processor 220, may cause the processor 220 to receive a device key 2401 of the networked device, where the networked device may be a network node in a nodal geographic network having multiple network nodes where the multiple network nodes may be connected with each other, and the device key may comprise one or more device identifying attributes of the networked device in the nodal geographic network.

The processing instructions 240, when executed by the processor 220, may also cause the processor 220 to: identify location information of the networked device in the nodal geographic network 2402, where the location information may represent a geographic relationship between the networked device and other network nodes of the nodal geographic network, assign a position attribute 2403 to the networked device according to the identified location information of the networked device in the nodal geographic network, add the position attribute to the device key as the non-inherent component for the networked device, and store the device key independently from the networked device 2404.

The network apparatus 210 may or may not be one of the multiple network nodes in the nodal geographic network. The device key may include one or more inherent device identifying attributes, as previously discussed. Non-transitory computer readable medium 230 of the network apparatus 210 may have additional processing instructions 230 that, when executed, may cause the processor 220 to save or store the updated device key in the non-transitory computer readable medium 230 of the network apparatus 210.

The network or the nodal geographic network disclosed herein may be a linear network wherein the multiple network nodes of the network may be arranged sequentially. The assigned position attribute may represent a linear geographic position for the networked device in the nodal geographic network. For example, the number three (3) may be assigned to the networked device having the third position in the linear network.

Furthermore, the processing instructions 240, when executed by the processor 220, may also cause the processor 220 to identify, assign and add the position attribute to a replacement device key of a replacement networked device when the replacement networked device is used for replacing the networked device.

Furthermore, the processing instructions 240, when executed by the processor 220, may also cause the processor 220 to compare the device key of the replacement device, which includes the position attribute for the replacement device, to the device key of the original networked device which also includes the position attribute, to determine if the replacement device is compatible in the nodal geographic network and trigger an error or alert if the replacement device key is incompatible.

The processing instructions 240, when executed by the processor 220, may cause the processor 220 to trigger an error or an alert when the networked device is detached from the network and is placed in a new network position in the nodal geographic network, where the relationship between the networked device and the other network nodes may be changed when the networked device is placed in the new network position.

Figure 3:
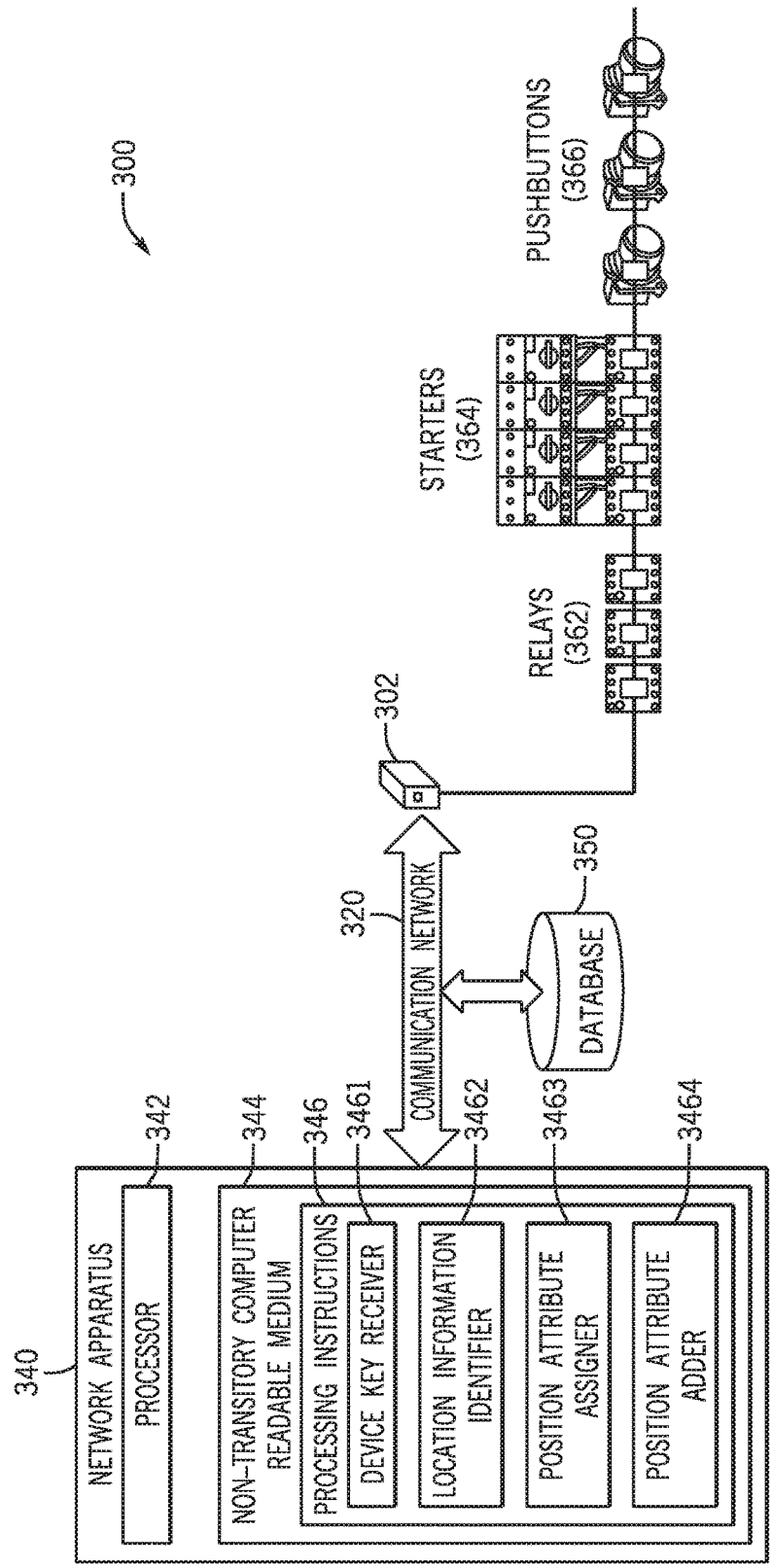
FIG. 3 illustrates a system that adds a non-inherent component to a device key of a networked device.

FIG. 3 illustrates a system 300 that adds a non-inherent component to a device key of a networked device. As shown in FIG. 3, the system 300 may include a nodal geographic network 360 having multiple network nodes such as relays 362, starters 364 and/or pushbuttons 366. The system may also include a network apparatus 340 having a processor 342 and non-transitory computer readable medium 344 storing processing instructions 346 for adding a non-inherent component to a device key of the networked device. The networked device may be one of the network nodes in the geographic network 360. The network apparatus 340 may be connected with the network 360 via communication network 320. Or alternatively, the network apparatus 340 may be connected directly to the network 320. The network apparatus 340 may store data in a standalone database 350, which may or may not be part of the network apparatus 340.

The processing instructions 346 may include a device key receiver 3461 to receive a device key of the networked device, where the networked device may be a network node in the nodal geographic network having the multiple network nodes where the multiple network nodes may be connected with each other, and the device key may include one or more device identifying attributes of the networked device in the nodal geographic network.

The processing instructions 346 may also include a location information identifier 3463 to identify location information of the networked device in the nodal geographic network 360, where the location information represents a geographic relationship between the networked device and other network nodes of the nodal geographic network 360.

The processing instructions 346 may include a position attribute assigner 3465 to assign a position attribute to the networked device according to the identified location information of the networked device in the nodal geographic network 360. The processing instructions 346 may further include a position attribute adder 3467 to add the position attribute to the device key as the non-inherent component for the networked device, and store the device key independently from the networked device.

As shown in FIG. 3, the network apparatus 340 may or may not be one of the multiple network nodes in the nodal geographic network 360. The position attribute adder 3467 may be configured to save the updated device key in the network apparatus 340. Or alternatively, the position attribute adder 3467 may save the updated device key in the database 350.

The nodal geographic network 360 may be a linear network, where the multiple network nodes of the network are arranged sequentially. The position attribute assigner 3465 may assign a position attribute to represent a linear geographic position for the networked device in the nodal geographic network.

The device key may include one or more device identifying inherent attributes, as previously discussed.

The position attribute adder 3467 may further be configured to add the position attribute to a device key of a replacement networked device when the replacement networked device is used for replacing the networked device.

The processing instructions 346, may further cause the device key of the replacement device in the nodal geographic network 360, which includes the position attribute for the replacement device, to be compared with the device key of the original networked device, which also includes the position attribute, to determine if the replacement device is compatible in the geographic network 360 and trigger an error or alert if the replacement device is incompatible.

The processing instructions 346 may further comprise an error trigger to trigger an error or an alert when the networked device is detached from the network and is placed in a new network position in the nodal geographic network 360. Particularly, the error or alert may be generated when the relationship between the networked device and the other network nodes is changed and is caused by placing the networked device in the new network position in the network 360.

Figure 4:
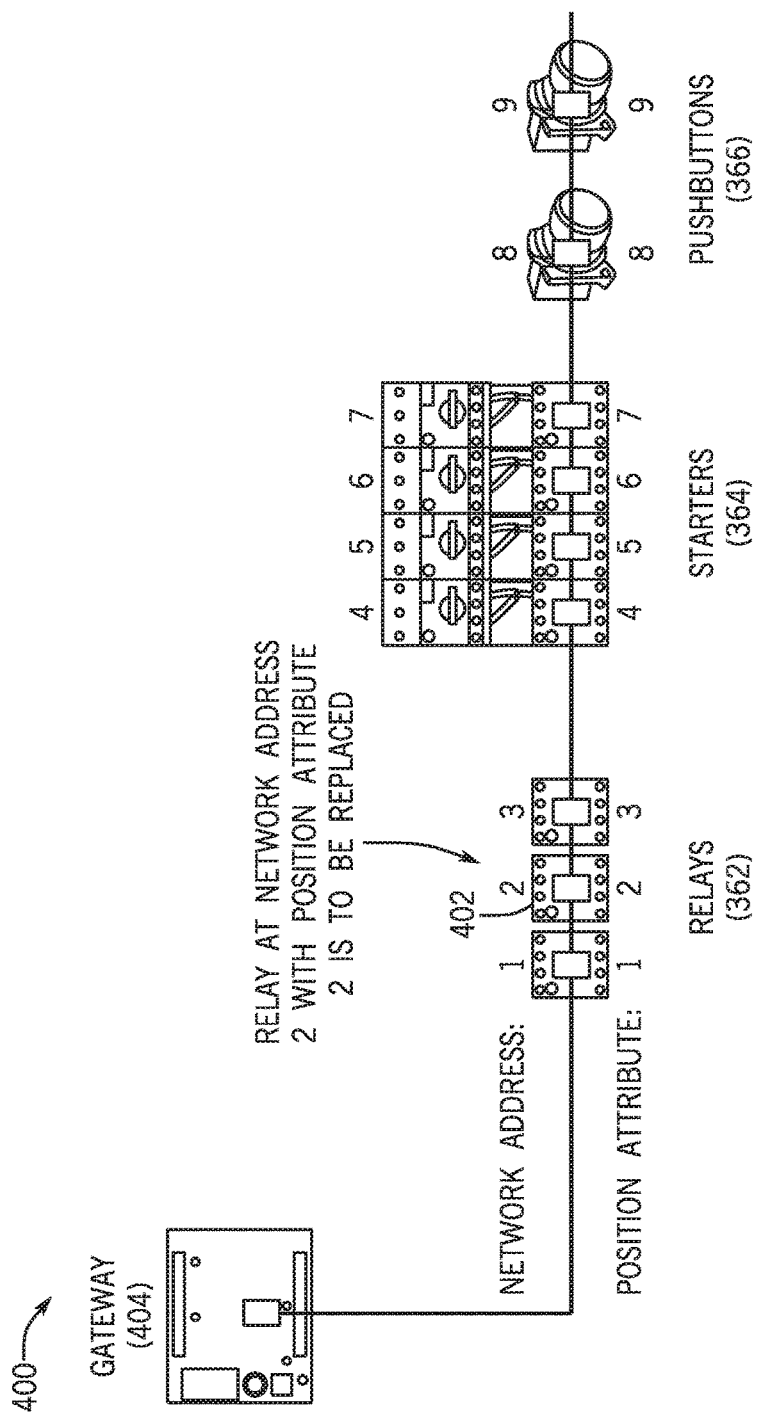
FIG. 4 illustrates a linear network with a networked device to be replaced.

FIG. 4 illustrates a linear network 400 with a networked device to be replaced. As shown in FIG. 4, the network 400 is a linear network with multiple network devices such as relays 362, starters 364 and pushbuttons 366. In FIG. 4, a networked device 402 is a relay and has a linear geographic position of two (2). As such, a position attribute two (2) may be assigned to the networked device 402. The position attribute two (2) may be added to the device key for the networked device 402 as the non-inherent component. The updated device key may be stored in the networked device 402 or may be stored in the gateway 404. As shown in FIG. 4, the networked device 402, e.g., a relay, may need to be replaced.

Figure 5:
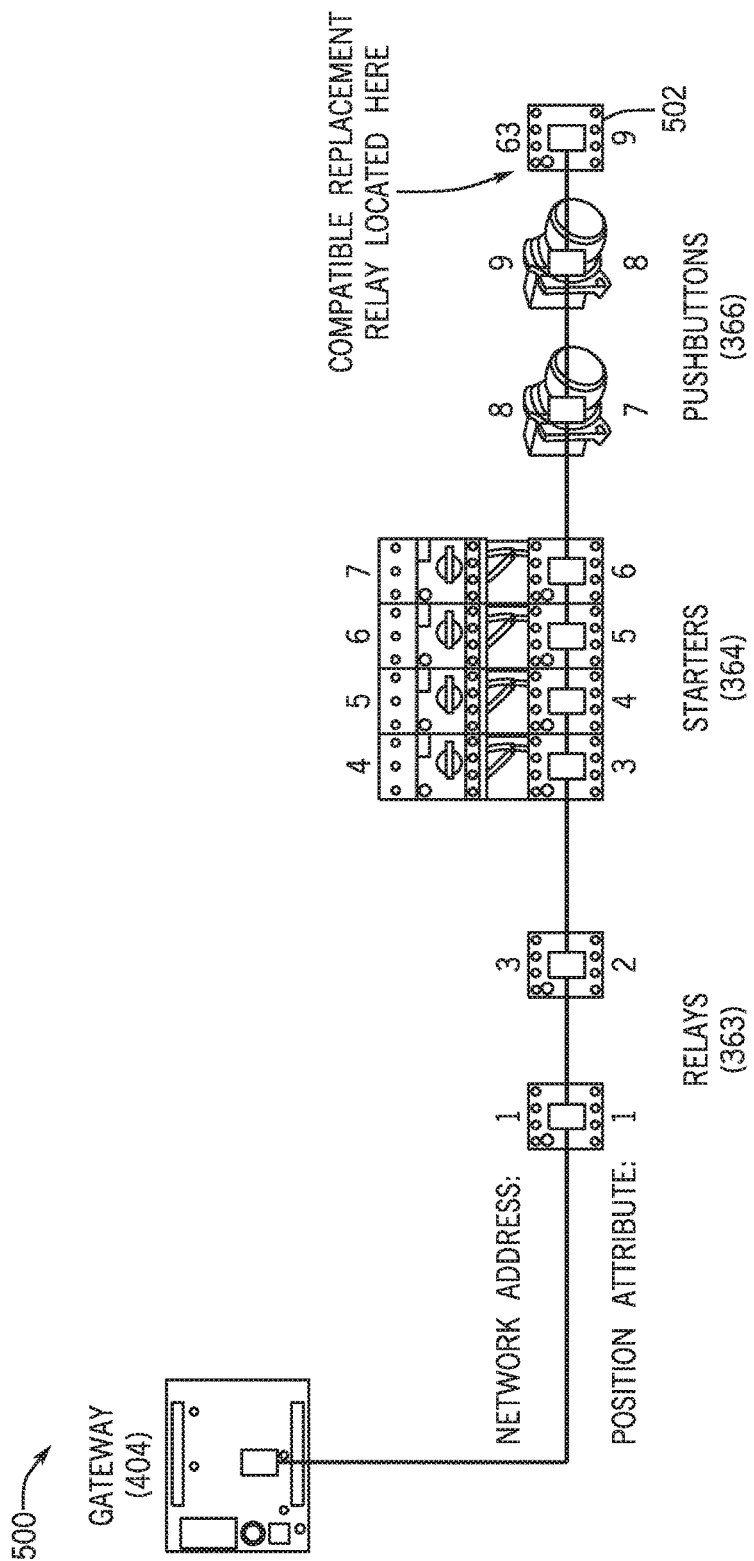
FIG. 5 illustrates a linear network with an improper placed replacement networked device.

FIG. 5 illustrates a linear network 500 with an improper placed replacement networked device. FIG. 5 shows a similar linear network as the one shown in FIG. 4. Relays 363, starters 364 and pushbuttons 366 are network nodes for the network 500. However, the relay 402 to be replace in FIG. 4 is no longer shown in FIG. 5. Instead, a compatible replacement device 502 for the relay 402 is placed in the network 500. However, because the relay 402 had position attribute two (2), the replacement device 502 should be placed in the second position in the linear network 500. As shown in FIG. 5, the compatible device 502 is placed in the ninth position of the linear network 500. As such, the gateway 404 may detect such an improper placement. The gateway 404 may trigger an error or an alert after discovering improper placement of the compatible device 502. The gateway 404 may simply prohibit the improper placement. Alternatively, the gateway 404 may allow the placement and trigger an alert or a warning message to the user of the network 500.

Figure 6:
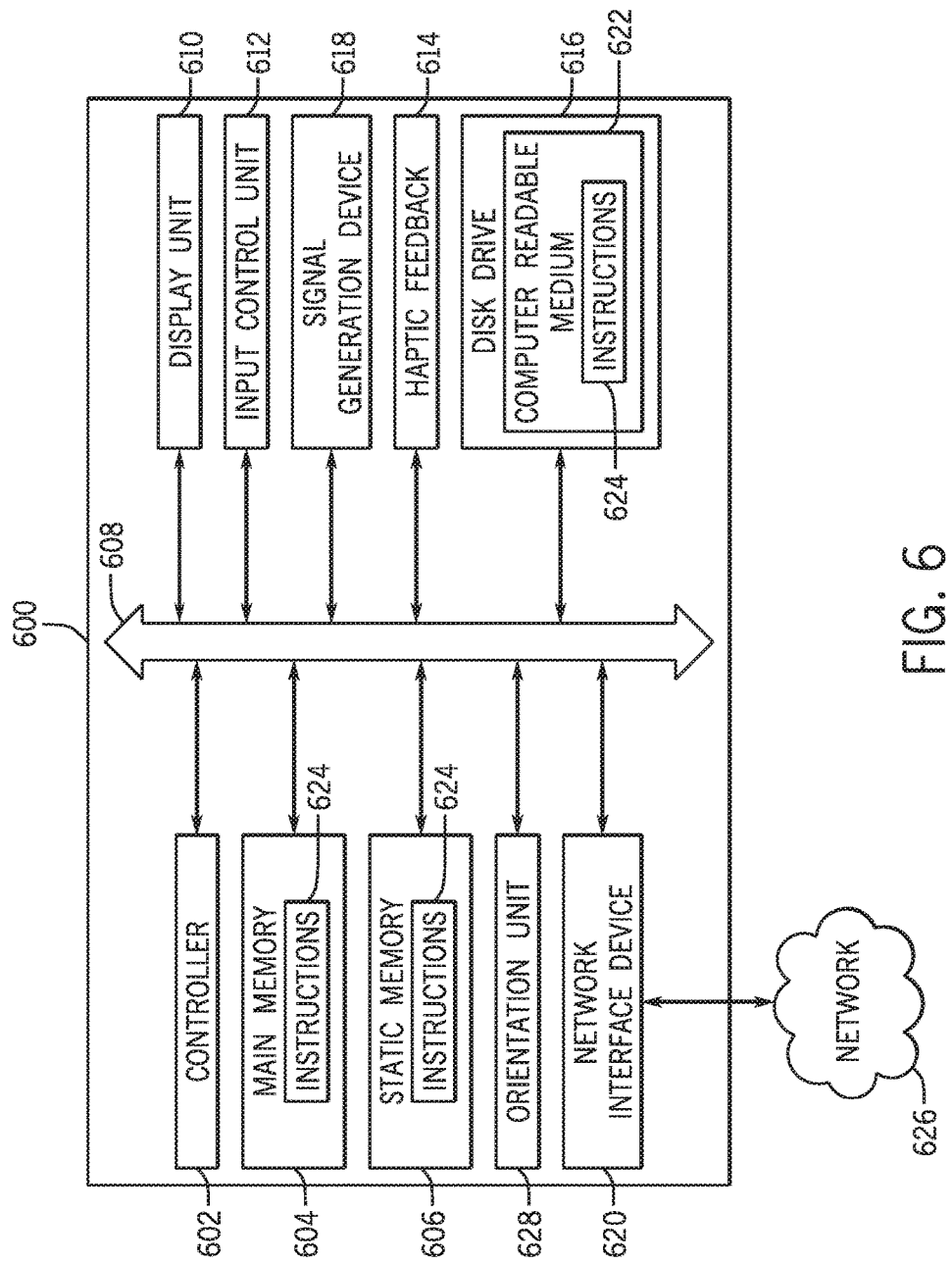
FIG. 6 illustrates an example of a computer system that may be used for adding a non-inherent component to a device key of a networked device.

FIG. 6 illustrates an example of a computer system 600 that may be used for adding a non-inherent component to a device key of a networked device. Referring to FIG. 6, an illustrative embodiment of a computer system 600 may be used for one or more of the components illustrated by the method and system in FIGS. 1-3, or in any other system configured to carry out the methods discussed in this disclosure. Although the computer system 600 is illustrated in FIG. 6 as including all of the components as illustrated, it is within the scope of this innovation for the computing system to be comprised of fewer, or more, components than just illustrated in FIG. 6.

The computer system 600 can include a set of instructions 624 that can be executed to cause the computer system 600 to perform any one or more of the methods, processes or computer-based functions disclosed herein. For example, a tool that adds a non-inherent component to a device key of a networked device as described herein may be a program comprised of a set of instructions 624 that are executed by the controller 602 to perform any one or more of the methods, processes or computer-based functions described herein. Such a program may be stored in whole, or in any combination of parts, on one or more of the exemplary memory components illustrated in FIG. 6, such as the main memory 604, static memory 606, or disk drive 616.

As described, the computer system 600 may be mobile device. The computer system 600 may also be connected using a network 626, to other computer systems or peripheral devices. In a networked deployment, the computer system 600 may operate in the capacity of a server or as a client user computer in a server-client user network environment, or as a peer computer system in a peer-to-peer (or distributed) network environment.

In addition to embodiments in which the computer system 600 is implemented, the computer system 600 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a controller 602, such as a central processing unit ("CPU"), a graphics processing unit ("GPU"), or both. Moreover, the computer system 600 can include a main memory 604, and additionally may include a static memory 606. In embodiments where more than one memory components are included in the computer system 600, the memory components can communicate with each other via a bus 608. As shown, the computer system 600 may further include a display unit 610, such as a liquid crystal display ("LCD"), an organic light emitting diode ("OLED"), a flat panel display, a solid state display, or a cathode ray tube ("CRT"). Additionally, the computer system 600 may include one or more input devices 612, such as a keyboard, push button(s), scroll wheel, digital camera for image capture and/or visual command recognition, touch screen, touchpad or audio input device (e.g., microphone). The computer system 600 can also include signal outputting components such as a haptic feedback component 614 and a signal generation device 618 that may include a speaker or remote control as non-limiting examples.

Although not specifically illustrated, the computer system 600 may additionally include a GPS (Global Positioning System) component for identifying a location of the computer system 600. Additionally, the computer system 600 may include an orientation unit 628 that includes any combination of one or more gyroscope(s) and accelerometer(s).

The computer system 600 may also include a network interface device 620 to allow the computer system 600 to communicate via wireless, or wired, communication channels with other devices. The network interface device 620 may be an interface for communicating with another computer system via a Wi-Fi connection, Bluetooth connection, Near Frequency Communication connection, telecommunications connection, internet connection, wired Ethernet connection, or the like. The computer system 600 may also optionally include a disk drive unit 616 for accepting a computer readable medium 622. The computer readable medium 622 may include a set of instructions that are executable by the controller 602, and/or the computer readable medium 622 may be utilized by the computer system 600 as additional memory storage.

In a particular embodiment, as depicted in FIG. 6, the disk drive unit 616 may include a computer-readable medium 622 in which one or more sets of instructions 624, such as software, can be embedded. Further, the instructions 624 may embody one or more of the methods, processes, or logic as described herein. In a particular embodiment, the instructions 624 may reside completely, or at least partially, within the main memory 604, the static memory 606, and/or within the controller 602 during execution by the computer system 600. The main memory 604 and the controller 602 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 600 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 622 that includes instructions 624 or receives and executes instructions 624 responsive to a propagated signal so that a device connected to a network 626 can communicate voice, video or data over the network 626. Further, the instructions 624 may be transmitted or received over the network 626 via the network interface device 620.

While the computer-readable medium 624 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 622 can include a solid-state memory such as a memory card or other package that houses one or more non-volatile read-only memories, such as flash memory. Further, the computer-readable medium 622 can be a random access memory or other volatile re-writable memory. Additionally, the computer-readable medium 622 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 622 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by network companies and broader resources and utilities institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the invention. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the invention.

Although the above discussion discloses various exemplary embodiments of the invention, it should be apparent that those skilled in the art can make various modifications that will achieve some of the advantages of the invention without departing from the true scope of the invention.

We claim:

1. A method of adding a non-inherent component to a device key of a networked device, the method comprising:
   receiving a device key of the networked device, wherein the networked device is a network node in a nodal geographic network having multiple network nodes and wherein the multiple network nodes are connected with each other, and the device key comprises one or more device identifying attributes of the networked device in the nodal geographic network;
   identifying location information of the networked device in the nodal geographic network, wherein the location information represents a geographic relationship between the networked device and other network nodes of the nodal geographic network;
   assigning a position attribute to the networked device according to the identified location information of the networked device in the nodal geographic network;
   adding the position attribute to the device key as the non-inherent component for the networked device;
   storing the device key; and
   triggering an error when the networked device is detached from the network and placed in a new network position in the nodal geographic network, or when the networked device is detached from the network and replaced with a new compatible device at a different network position in the nodal geographic network.

2. The method of claim 1, wherein the one or more device identifying attributes comprises at least one of a device vendor, a device type, a device product code and a device series.

3. The method of claim 1, wherein the nodal geographic network is a linear network and wherein the multiple network nodes of the linear network are arranged sequentially.

4. The method of claim 3, wherein the assigned position attribute represents a linear geographic position for the networked device in the nodal geographic network.

5. The method of claim 4, further comprising adding the position attribute to a device key for a replacement networked device when the replacement networked device is used for replacing the networked device.

6. The method of claim 1, further comprising saving the device key in a network device, wherein the network device is not one of the multiple network nodes in the nodal geographic network.

7. The method of claim 1, wherein the geographic relationship between the networked device and the other network nodes is changed when the networked device is placed in the new network position.

8. The method of claim 1, wherein the geographic relationship between the new networked device and the other network nodes is changed from the original geographic relationships.

9. A network apparatus comprising: a processor and non-transitory computer readable medium storing processing instructions for adding a non-inherent component to a device key of a networked device, wherein the processing instructions, when executed by the processor, cause the processor to:
receive a device key of the networked device, wherein the networked device is a network node in a nodal geographic network having multiple network nodes and wherein the multiple network nodes are connected with each other, and the device key comprises one or more device identifying attributes of the networked device in the nodal geographic network;
identify location information of the networked device in the nodal geographic network, wherein the location information represents a geographic relationship between the networked device and other network nodes of the nodal geographic network;
assign a position attribute to the networked device according to the identified location information of the networked device in the nodal geographic network;
add the position attribute to the device key as the non-inherent component for the networked device;
store the device key; and
trigger an error when the networked device is detached from the network and placed in a new network position in the nodal geographic network, or when the networked device is detached from the network and replaced with a new compatible device at a different network position in the nodal geographic network.

10. The network apparatus of claim 9, wherein the one or more device identifying attributes comprises at least one of a device vendor, a device type, a device product code and a device series.

11. The network apparatus of claim 9, wherein the nodal geographic network is a linear network and wherein the multiple network nodes of the linear network are arranged sequentially.

12. The network apparatus of claim 11, wherein the assigned position attribute represents a linear geographic position for the networked device in the nodal geographic network; and
wherein the processing instructions further cause the processor to add the position attribute to a device key of a replacement networked device when the replacement networked device is used for replacing the networked device.

13. The network apparatus of claim 9, wherein the processing instructions further cause the processor to save the device key in the non-transitory computer readable medium of the network apparatus, and the network apparatus is not one of the multiple network nodes in the nodal geographic network.

14. The network apparatus of claim 9, wherein the geographic relationship between the networked device and the other network nodes is changed when the networked device is placed in the new network position.

15. The network apparatus of claim 9, wherein the geographic relationship between the new networked device and the other network nodes is changed from the original geographic relationships.

16. A system comprising:
a nodal geographic network having multiple network nodes;
a networked device of the nodal geographic network; and
a network apparatus having a processor and non-transitory computer readable medium storing processing instructions for adding a non-inherent component to a device key of the networked device, wherein the processing instructions comprise:
receiving a device key of the networked device, wherein the networked device is a network node in the nodal geographic network having the multiple network nodes and wherein the multiple network nodes are connected with each other, and the device key comprises one or more device identifying attributes of the networked device in the nodal geographic network;
identifying location information of the networked device in the nodal geographic network, wherein the location information represents a geographic relationship between the networked device and other network nodes of the nodal geographic network;
assigning a position attribute to the networked device according to the identified location information of the networked device in the nodal geographic network;
adding the position attribute to the device key as the non-inherent component for the networked device;
storing the device key; and
triggering an error when the networked device is detached from the network and placed in a new network position in the nodal geographic network, or when the networked device is detached from the network and replaced with a new compatible device at a different network position in the nodal geographic network.

17. The system of claim 16, wherein the nodal geographic network is a linear network and wherein the multiple network nodes of the linear network are arranged sequentially, and the assigned position attribute represents a linear geographic position for the networked device in the nodal geographic network.

18. The system of claim 16, wherein the processing instructions further comprising saving the device key in the network apparatus, and wherein the network apparatus is not one of the multiple network nodes in the nodal geographic network.

19. The system of claim 16, wherein the geographic relationship between the networked device and the other network nodes is changed when the networked device is placed in the new network position.

20. The system of claim 16, wherein the geographic relationship between the new networked device and the other network nodes is changed from the original geographic relationships.

* * * * *